United States Patent
Simon et al.

(10) Patent No.: US 12,495,280 B2
(45) Date of Patent: Dec. 9, 2025

(54) METHOD AND SYSTEM FOR MOBILITY POLICY VALIDATION/CERTIFICATION

(71) Applicant: AT&T Intellectual Property I, L.P., Atlanta, GA (US)

(72) Inventors: Sean Simon, Lynnwood, WA (US); Kim Haislip, Stone Mountain, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 474 days.

(21) Appl. No.: 18/180,250

(22) Filed: Mar. 8, 2023

(65) Prior Publication Data

US 2024/0305961 A1    Sep. 12, 2024

(51) Int. Cl.
*H04W 4/24* (2024.01)
*H04W 8/18* (2009.01)

(52) U.S. Cl.
CPC .............. *H04W 4/24* (2013.01); *H04W 8/18* (2013.01)

(58) Field of Classification Search
CPC ......... H04W 4/24; H04W 8/18; H04W 24/06; H04L 12/14; H04L 12/1407; H04M 15/41; H04M 15/58; H04M 15/66; H04M 15/73
See application file for complete search history.

(56) References Cited

U.S. PATENT DOCUMENTS

| | | | |
|---|---|---|---|
| 2016/0330328 A1* | 11/2016 | Garg | H04W 4/24 |
| 2021/0006993 A1 | 1/2021 | Chow et al. | |
| 2022/0286307 A1* | 9/2022 | Thompson | H04M 15/8016 |
| 2023/0084355 A1* | 3/2023 | Junkins | H04M 15/00 370/329 |
| 2023/0164598 A1 | 5/2023 | Yao et al. | |
| 2023/0300648 A1 | 9/2023 | Wangler et al. | |
| 2024/0106731 A1 | 3/2024 | Ramesh et al. | |

FOREIGN PATENT DOCUMENTS

WO    2021034906 A1    2/2021

OTHER PUBLICATIONS

Song, JaeSeung, Cristian Cadar, and Peter Pietzuch. "SymbexNet: Testing network protocol implementations with symbolic execution and rule-based specifications." IEEE Transactions on Software Engineering 40.7 (2014): 695-709. (Year: 2014).*

* cited by examiner

*Primary Examiner* — Sharad Rampuria
(74) *Attorney, Agent, or Firm* — Guntin & Gust, PLC; Kenneth S. Kwan

(57) ABSTRACT

Aspects of the subject disclosure may include, for example, identifying one or more rules in a policy rulebase, wherein the one or more rules correspond to a subscriber associated with a network, instructing a test agent to derive one or more scripts that, when executed by a client, cause the client to generate test traffic and send the test traffic to the network, after the instructing and after the test traffic is sent to the network, accessing data records that are outputted by the network based on the test traffic, based on the accessing, correlating at least one record of the data records to the test traffic, and analyzing the at least one record to validate conformance with the one or more rules. Other embodiments are disclosed.

20 Claims, 7 Drawing Sheets

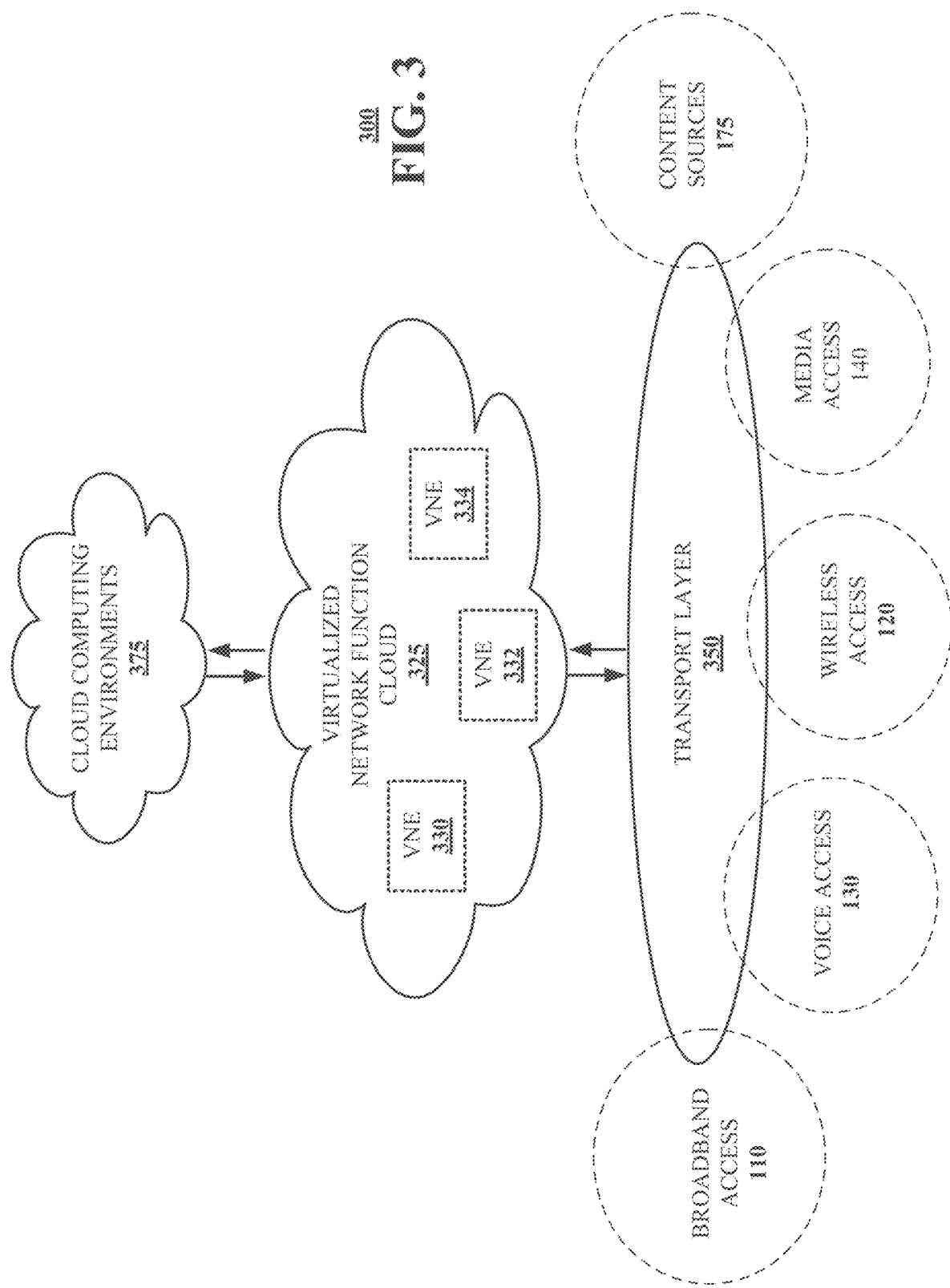

METHOD AND SYSTEM FOR MOBILITY POLICY VALIDATION/CERTIFICATION

FIELD OF THE DISCLOSURE

The subject disclosure relates to dynamic policy certification/validation.

BACKGROUND

A mobile network generally has a set of rules—i.e., a "rulebase"—that identifies whether/how mobility services are to be provided to subscribers. A Long-Term Evolution (LTE) Evolved Packet Core (EPC) may include a Policy and Charging Rules Function (PCRF) that provides policy control decision-making functions and flow-based billing control (i.e., for general network control relating to service data flow detection, quality of service, and charge-based charging control), and a Policy Charging and Enforcement Function (PCEF) that performs application of policies and provides follow-up billing functions (i.e., for generally managing user traffic and the quality of service at a gateway). A 5G core (5GC) may include a Policy Control Function (PCF) similar to the PCRF. Some or all of these functions in a given core network may operate based on rules in one or more rulebases.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
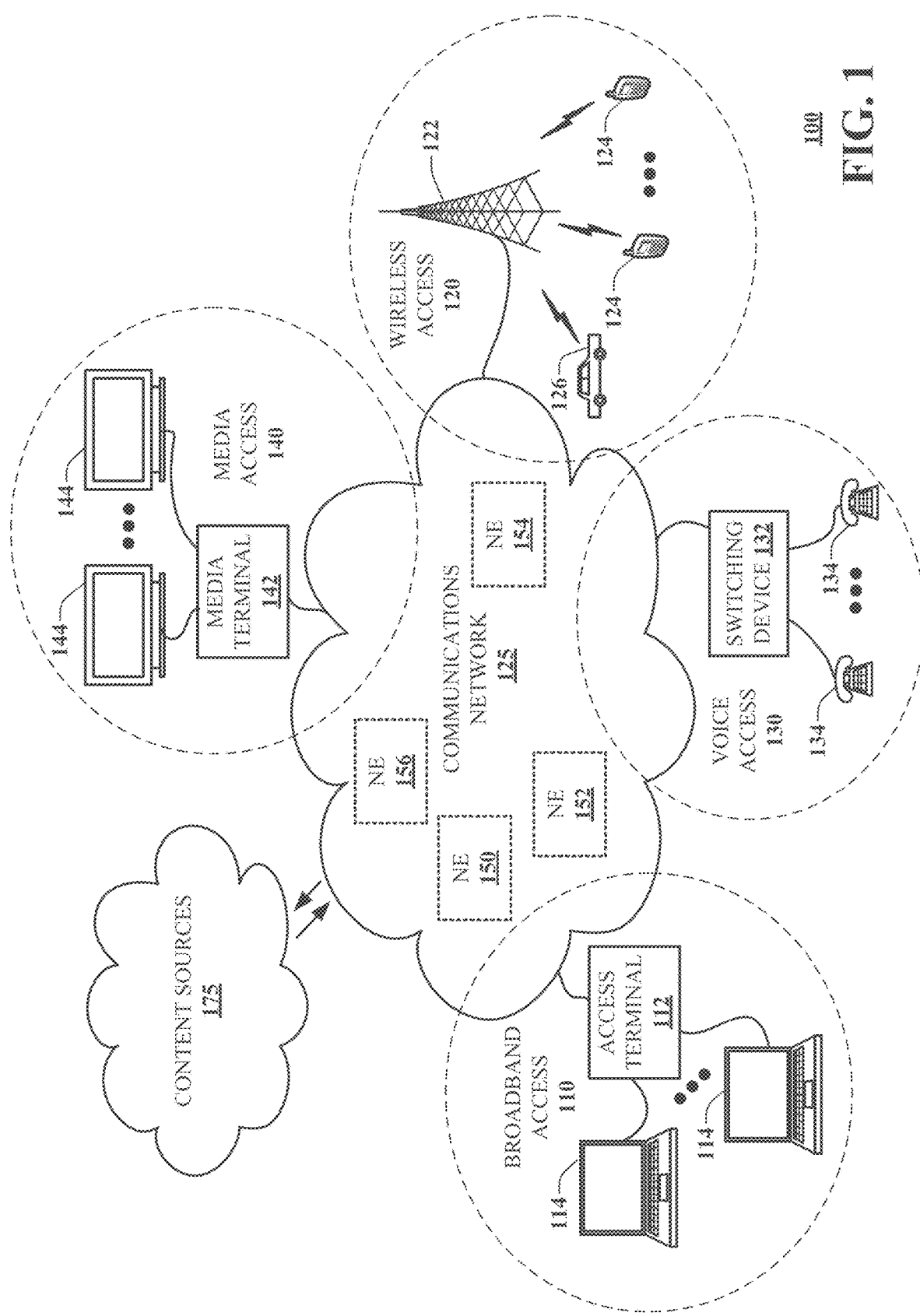
FIG. 1 is a block diagram illustrating an exemplary, non-limiting embodiment of a communications network in accordance with various aspects described herein.

Rules in a rulebase are generally shared between the policy complex (e.g., LTE, 5G Standalone (SA), etc.) and a user-plane policy charging function (e.g., PCEF or the like). A policy may be certified end-to-end so as to validate the correct behaviors of the system, especially after changes are made the policy rulebase. Application code changes in affected infrastructure elements would then provide services using the policy end-to-end framework. However, a rulebase can be extremely complex and extend to thousands of entries, and thus incorrect alignment between configurations in core network elements can lead to incorrect treatments or billing. For instance, errors in configuration or treatments associated with policy can result in a variety of issues, such as incorrect subscriber treatments, subscriber-impacting events, an inability to apply a unique policy instead of a default policy, or overall platform instability that leads to catastrophic failure.

The subject disclosure describes, among other things, illustrative embodiments of a mobility policy certification engine (MPCE) that is capable of analyzing or inspecting the details of a mobility carrier's rate policy, cause corresponding traffic to be generated, and perform downstream verification to ensure accurate billing and treatment.

The attributes used for differentiated billing or service may be based upon Internet Protocol (IP) layer data and/or data for other layers in the open systems interconnection (OSI) model. In one or more embodiments, the attributes may be based upon one or more of Layer 3 (L3) through Layer 7 (L7) data. In some embodiments, the attributes may additionally, or alternatively, be based upon one or more of time of day, subscriber location, and/or subscriber class or associated rate plans. In any case, the MPCE may generate traffic that corresponds to defined (e.g., L3-L7) data flows to verify whether the generated traffic conforms to the policy rulebase.

In exemplary embodiments, the MPCE is capable of performing the aforementioned functions in a dynamic fashion. For instance, the MPCE may be capable of monitoring the policy rulebase, detecting incremental changes thereto, dynamically cause traffic to be generated in accordance with the detection (or on demand), and performing downstream verification of billing/treatments against the newly-updated rules.

While the MPCE is generally described herein as being implemented for use with a mobile core, it is to be understood and appreciated that the engine can be universally implemented for use with any type of system in which there is policy-based differentiation of traffic (whether for purposes of monetizing the system infrastructure or otherwise). As an example, the engine may be employed for policy-based verification in a wireline system, where differentiation of protocols/traffic for a user/subscriber base is used as a basis for policy construction. As another example, next generation technology specifications are beginning to define behaviors and treatments for different types of networks that interwork, where traffic may transit a mobile core. For instance, a shared or hybrid system may include an LTE network, a 5G network, a Wi-Fi network, a Fixed Wireless network, and/or a wireline network that can all interwork and function as candidates for transport. A common policy charging/enforcement function may be shared among the different networks, where procedures may be defined such that there is commonality in treatments and behaviors for traffic across the various networks. Here, the engine may be capable of verifying whether there is uniform billing/treatments when a user transitions from using one network technology to another. For example, the engine may be capable of validating that a common subscriber experience (for any of a number of characteristics in a policy rulebase) has been constructed, by validating proper billing and treatment when the subscriber switches from using Wi-Fi to a mobile core (e.g., LTE, 5G, etc.), the mobile core to Fixed Wireless, etc.

It is to be understood and appreciated that the MPCE may be capable of facilitating any characteristics that can be affected by policy. For instance, in addition (or as an alternative) to validation of rules-based billing/treatments, the MPCE may be capable of facilitating rules-based correlation and analysis (e.g., correlating subscriber data rates for access type based on policy).

It is also to be understood and appreciated that the MPCE may be capable of certifying/validating other types of policies, such as those relating to the mobility infrastructure. For instance, the MPCE may be capable of certifying/validating policies that require a user session (upon or after user logon/attachment to the network) to be directed to an enterprise network (rather than to the Internet). In such a case, policy-based treatments may not necessarily be limited to treating subscribers in-band (L3-L7). The notion of "policy," therefore, can be expansive/exhaustive and not simply restricted to policies that are subscriber specific. In one or more embodiments, the MPCE may be capable of performing additional actions relating to subscriber traffic, such as causing the traffic for L3-L7 to undergo traffic shaping, causing packets with different qualities of service (QoS) (e.g., latency, transmission speed, transmission frequency, routing, uplink/downlink, etc.) to be re-marked, causing certain routing decisions to be made for the traffic, and/or the like.

In any case, leveraging existing, standards-based services in a way that consolidates capabilities into automated workflows for purposes of certifying/validating a policy rulebase, as described herein, enables a network provider to more reliably and consistently provide differentiated services for a user base and generally monetize mobility services. Embodiments of the policy certification/validation engine improve over existing technology/techniques in that incremental changes to policy rulebase(s)—i.e., changes that can number in the thousands, millions, etc., given the large number of subscribers or users that a network may have—can be automatically and dynamically tested by the engine with minimal to no administrator intervention. Manual testing or manual script development for policy verification is highly complex, does not scale well, and is costly to mobility providers. Failure to accurately enforce policy by network elements can lead to outages, catastrophic failures, or significant reputational risk. Implementing automated testing and certification of policy rulebases (e.g., via analysis or inspection of subscriber traffic and/or individual subscriber characteristics) advantageously addresses or eliminates these problems. Verifying incremental changes to a network provider's differentiated services approach to monetization also allows the provider to go to market more quickly with new products or services.

One or more aspects of the subject disclosure include a device, comprising a processing system including a processor, and a memory that stores executable instructions that, when executed by the processing system, facilitate performance of operations. The operations can include identifying one or more rules in a policy rulebase, wherein the one or more rules correspond to a subscriber associated with a network. Further, the operations can include instructing a test agent to derive one or more scripts that, when executed by a client, cause the client to generate test traffic and send the test traffic to the network. Further, the operations can include, after the instructing and after the test traffic is sent to the network, accessing data records that are outputted by the network based on the test traffic. Further, the operations can include, based on the accessing, correlating at least one record of the data records to the test traffic. Further, the operations can include analyzing the at least one record to validate conformance with the one or more rules.

One or more aspects of the subject disclosure include a non-transitory machine-readable medium, comprising executable instructions that, when executed by a processing system including a processor, facilitate performance of operations. The operations can include receiving, from a policy certification engine, a command to generate test traffic, wherein the command is provided based on the policy certification engine identifying one or more rules in a policy rulebase that correspond to a subscriber associated with a core network. Further, the operations can include deriving one or more scripts based on the receiving. Further, the operations can include executing the one or more scripts to generate the test traffic. Further, the operations can include causing the test traffic to be transmitted over a mobility network to the core network, wherein the causing enables the policy certification engine to access data records that are outputted by the core network based upon traversal of the test traffic through the core network, correlate at least one record of the data records to the test traffic, and analyze the at least one record to validate conformance with the one or more rules.

One or more aspects of the subject disclosure include a method. The method can comprise detecting, by a processing system including a processor, an incremental change to a rule in a policy rulebase, wherein rule is associated with a user of a network, and wherein the incremental change specifies a particular treatment that the network is to apply to traffic relating to the user. Further, the method can include, based on the detecting, causing, by the processing system, a test agent of a client device of the user to derive a test script that, when executed by the client device, outputs test traffic to the network. Further, the method can include, responsive to the causing, obtaining, by the processing system, data records that are outputted by the network after the test traffic traverses at least a portion of the network. Further, the method can include, based on the obtaining, correlating, by the processing system, at least one record of the data records to the test traffic. Further, the method can include analyzing, by the processing system, the at least one record to verify that the particular treatment has been applied to the test traffic.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, dynamic policy certification/validation. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
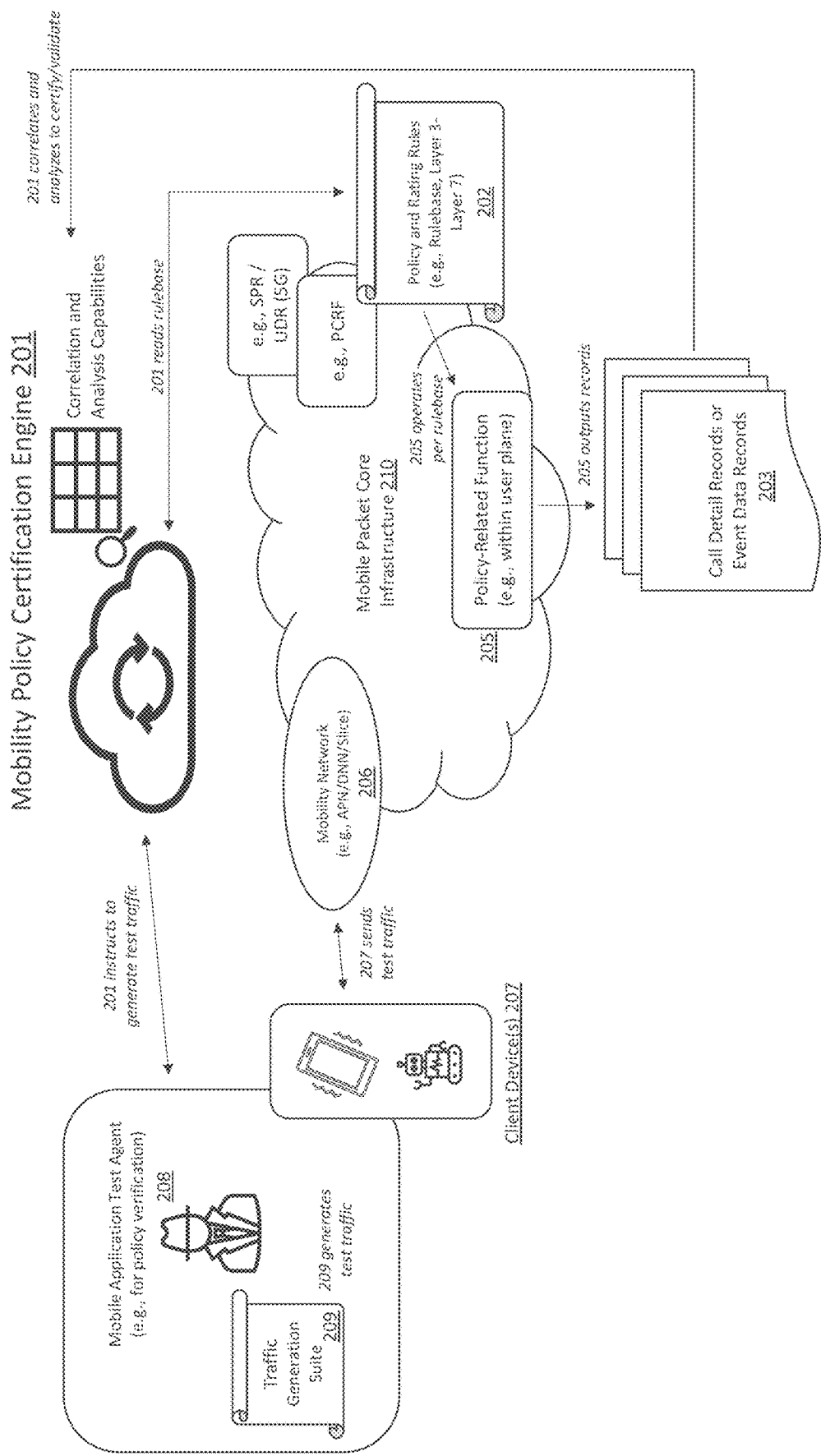
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or operatively overlaid upon, the communications network of FIG. 1 in accordance with various aspects described herein. As shown in FIG. 2A, the system 200 may include an MPCE 201 (with correlation and analysis functions), a set of policy and rating rules 202 (i.e., a rulebase), records 203 (e.g., call detail records and/or event data records), and one or more policy-related functions 205. The system 200 may also include client device(s) 207 equipped with a test agent 208 and a traffic generation suite 209. The client device(s) 207 may communicate with a core network 210 via mobility network element(s) 206.

In various embodiments, the core network 210 may include various network devices and/or systems that provide a variety of functions. Examples of functions provided by, or included, in the core network 210 include an access mobility and management function (AMF) configured to facilitate mobility management in a control plane of the system 200, a user plane function (UPF) configured to provide access to a data network, such as a packet data network (PDN), in a user (or data) plane of the system 200, a Unified Data Management (UDM) function, a Session Management Function (SMF), a PCF, and/or the like. The core network 210 may be in communication with one or more other networks (e.g., one or more content delivery networks (CDNs)), one or more services, and/or one or more devices. In various embodiments, the core network 210 may include one or more devices implementing other functions, such as a master user database server device for network access management, a PDN gateway server device for facilitating access to a PDN, and/or the like. The core network 210 may include various physical/virtual resources, including server devices, virtual environments, databases, and so on. The core network 210 may include or be implemented in a 3G core, a 4G/long term evolution (LTE) core, a 5G core, a 6G core, or a core for a higher generation technology.

The mobility network access point name (APN)/dynamic network name (DNN)/Access/(e.g., 5G) slice 206 may be the network element(s) that subscribers may utilize to obtain service within the core network 210. In various embodiments, the mobility network 206 may include or coordinate with an access network, such as a wireless radio access network (RAN), a Wi-Fi network, and/or a wireline network. The access network may include network resources, such as one or more physical access resources and/or one or more virtual access resources. Physical access resources can include base station(s) (e.g., one or more eNodeBs, one or more gNodeBs, or the like), one or more satellites or uncrewed aerial vehicles (UAVs), one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as LTE, 5G, 6G, or any higher generation RAT. One or more edge computing devices (e.g., multi-access edge computing (MECs) devices or the like) may also be included in or associated with the access network. In various embodiments, the mobility network 206 can include various heterogeneous cell configurations with various quantities of cells and/or types of cells.

The policy-related function 205 may be a function implemented in the core network 210. The policy-related function 205 may be configured to observe subscriber user-plane data and tag the subscriber user-plane data in accordance with defined policies for the purposes of rating, providing differentiated services, packet marking, policing/shaping, and so on. As an example, in a case where the core network 210 is an EPC, the policy-related function 205 may be PCEF. As another example, in a case where the core network 210 is a 5GC, the policy-related function 205 may be a PCF. In certain embodiments, a subscriber profile repository (SPR)/ unified data repository (UDR) may store and manage subscriber-specific policy control data (e.g., device(s) associated with each subscriber, data rate for each subscriber, rate plan for each subscriber, rulebase for each subscriber, etc.), where a PCRF or the like may access and pull subscriber-level details from the SPR/UDR and identify which policy and which billing/treatments should apply.

Rulebase 202 may be a collection of charging rules having identifiers (e.g., Policy and Charging Control (PCC) IDs) and corresponding rule definitions, which can be provisioned to a management function, such as a session management function (SMF) or the like. In exemplary embodiments, the rulebase 202 may reside in the core network 210. For instance, the rulebase 202 may reside in a storage area that is accessible to the PCEF 205, such as in accordance with 3rd Generation Partnership Project (3GPP) architecture standards. The rulebase 202 may define billing/treatments for traffic/traffic loads, such as traffic throttling, rate-limiting, over-the-top (OTP) treatment(s), IP address assignment(s), topology assignment(s) for next-hop routing, premium service treatments (e.g., differentiated services code points (DSCPs), available maximum bitrate (ABR), etc.), and so on.

In exemplary embodiments, and as described in more detail below, the MPCE 201 may perform various functions, including obtaining one or more subscriber policies (e.g., enterprise, consumer, mobile virtual network operator (MVNO), media access control (MAC), etc.) from the rulebase 202, utilizing the test agent 208 to (e.g., push test suites that) derive traffic for device(s) 207 (whether real or simulated) that corresponds to policy rulebase entries, and performing downstream verification of records that correlate to the traffic so as to verify conformance with the one or more subscriber policies.

Call Detail Records (CDR) and Event Data Records (EDR) 203 may be produced or outputted by the core network 210. In various embodiments, CDR and/or EDR 203 may reflect subscriber usage, subscriber attributes, as well as treatments applied to the subscriber's traffic. For instance, CDR and/or EDR 203 may include/identify subscriber rate limits (e.g., available bit rate (ABR), guaranteed bit rate (GBR), etc.), one or more service data containers (e.g., a List of Service Data field in a CDR), rulebase that is applied, usage per rule or according to a rule, and/or the like. In one or more embodiments, the various records may be keyed (e.g., identifying time, location, network, slice, International Mobile Subscriber Identifier (IMSI), and/or other mobility characteristics that are specific to the user and/or session). In some cases, the policy-related function 205 (e.g., PCEF) may be implemented as a child process in a PDN gateway (PGW) or user plane function that assigns an IP address for the user's device and that signals to other systems in the mobile core to provide and "police" the service accordingly for the user (e.g., to ensure that traffic speeds are at a negotiated data rate or that traffic is treated in accordance with some relevant policy). Here, the policy-related function 205 may be aware of the IP address as well as other details, such as the session ID, binding information, and so on, may track the traffic associated with the subscriber using this information, and may output records 203 (e.g., EDR protocol L4 flow-based details, data volume, and so on; CDR details, such as duration of subscriber attachment, mobility infrastructure that was attached to by the subscriber, and so on). In certain embodiments, there may be an internal array or spreadsheet (e.g., a list of service data) for each policy rule entry in the rulebase 202 that identifies the traffic volume per policy. In certain embodiments, records 203 may be streaming into an online charging service (e.g., 5G), where some or all of these streams may be tagged and differentiated. In one or more embodiments, details associated with generated test traffic (e.g., as provided by the test agent 208) may also be obtained/known. For instance, the test agent 208 may provide time stamps relating to a duration of generated traffic, OTP application details, etc. In this way, the MPCE 201 may have access to a variety of information that it can use to correlate records 203 with the generated traffic for a given subscriber so as to facilitate verification of the billing/treatments for the subscriber.

The client device(s) 207 may include actual (e.g., real) client devices and/or simulated client devices that generate mobility attaches to the core network 210. The client device (s) 207 may be associated with a user (e.g., subscribers/customers of the provider's network; etc., employees or contractors of an operator or provider of the core network 210; etc.), and may include one or more devices capable of receiving, generating, storing, processing, and/or providing data (e.g., audio data, video data, text data, control data, etc.) relating to the MPCE 201. For example, a client device 207 can include a communication and/or computing device, such as a mobile phone (e.g., a smart phone, a radiotelephone, etc.), a laptop computer, a tablet computer, a handheld computer, a display device, a gaming device, a wearable communication device (e.g., a smart wristwatch, a pair of smart eyeglasses, media-related gear (e.g., a pair of extended reality glasses, a headset, headphones, and/or the like), etc.), a similar type of device, or a combination of some or all of these devices.

The agent 208 may be configured to intake directions from the MPCE 201 to generate mobility attach scenarios and traffic that correlate to policy entries identified by the MPCE 201. The suite of test cases 209 may be configured to generate test criteria and/or parameters for execution by the client device(s) 207. In some embodiments, the agent 208 and/or the traffic generation suite 209 may be implemented in a given client device 207. In various embodiments, some or all of the functions of the test agent 208 and/or the traffic generation suite 209 may be the same as or similar to some or all of the functions of various components described in co-pending U.S. patent application Ser. No. 17/953,507, entitled "NEXT GENERATION WIRELINE WIRELESS AUTOMATION FOR TESTING AND VALIDATION OF NETWORK FUNCTIONS AND SERVICES," filed on Sep. 27, 2022, which is incorporated by reference herein in its entirety. For instance, the agent 208 and/or the traffic generation suite 209 may be the same as or similar to some or all of the functions of the app or test scripts described in said co-pending application. In exemplary embodiments, the MPCE 201 and its the correlation and analysis functions may leverage the app or test script system/functionality described in said co-pending application to generate test traffic for purposes of downstream verification.

In various embodiments, the MPCE 201 may be configured to pull available policy rulebase(s) 202 within a policy complex (e.g., LTE, 5G, etc.), and identify traffic that corresponds to (e.g., each of) the policy rulebase entries in L3 through L7, subscriber attributes, or any other implied policy elements. For example, L3 traffic can be zero-rated (i.e., not billed) based on destination address, L4 may be zero-rated based on application protocol (e.g., transmission control protocol (TCP), user datagram protocol (UDP), port, etc.), Layer 7 may be zero-rated for certain top-off pages in certain scenarios (e.g., to enable a prepaid subscriber to access the web to purchase more data in a case where the user has reach the quota limit), and so on. Thus, the rulebase 202 may identify this information (e.g., at the IP level, at the protocol level, at the port level, along with source/destination data, along with regular expressions, etc.), which the policy-related function 205 may "ingest" to determine which traffic corresponds to which layer. In various embodiments, client device(s) 207 may be agent-based (e.g., may be equipped with test agent 208/suite 209) and served by the RAN. Alternatively, the device(s) 207 may be simulated clients. In any case, once identified, traffic generating instructions may be pushed by the MPCE 201 to the client-side agent to generate traffic for the purposes of correlation and analysis. The MPCE 201 can then pull corresponding EDRs/CDRs 203 that are associated with the subscriber's session(s) used during traffic generation for the purpose of validation. These records can then be analyzed to ensure proper rating or treatments for the subscriber as stated by the policy rulebase.

The following is a brief description of a non-limiting example use case of the system 200, in which the MPCE 201 dynamically evaluates a current rulebase 202, employs a test agent 208 and client device(s) 207 to drive traffic, and analyzes or inspects output records to ensure accuracy of billing/treatments. For instance, assume that the rulebase 202 includes rule(s) specific to a particular content streaming site, where one or more uniform resource locators (URLs) and/or protocols are associated with the site, and where the policy is to zero rate traffic associated with the site. That is, traffic associated with the site may need to be zero rated (i.e., not charged or billed for). The MPCE 201 may coordinate with the policy-related function 205 and/or one or more other functions (e.g., PCRF, SPR/UDR, etc.) to read or identify the policy definitions in the rulebase 202, and may cause traffic to be constructed that corresponds to filters/criteria dictated by the policy. Here, the MPCE 201 may instruct the test agent 208 to define a script that, when executed by a processing system on the client device(s) 207, cause the client device(s) to generate the traffic. The client device(s) 207 may send the traffic to the core network 210 via mobility network 206. As traffic is generated and received at the core network 210, the policy-related function 205 may (e.g., continuously) analyze/inspect the traffic and mark the traffic in accordance with the policy (i.e., zero rating it). The policy-related function 205 may output a note of record for the billing (e.g., CDR) and/or output protocol-level analysis results (e.g., EDR) relating to URLs that are currently being served by the client device(s) 207 in the amount of traffic that's being generated. The MPCE 201 may then correlate the outputted records to determine whether the particular rule to zero rate such traffic was properly performed—i.e., that the generated traffic was not inadvertently billed. In a different situation where the policy is to additionally, or alternatively rate limit such traffic to a certain speed or to modify the behavior of a certain codec on the client device(s) 207, the MPCE 201 may correlate the outputted records to determine whether such was properly performed—i.e., that the generated traffic was capped to a certain speed or if output data associated with the codec indicates that the behavior was successfully modified.

In various embodiments, the MPCE 201 may not only read current policies that are applied for a given subscriber base, cause test traffic to be generated, and analyze artifacts from the test session to validate that there is a match with the policy's billing/treatments, but may, in a case where there is a policy "miss" (i.e., a policy certification/validation that is unsuccessful, such as a zero rate policy not resulting in generated test traffic that was zero rated), additionally perform one or more actions based on detecting the policy miss. As one example, the MPCE 201 may (e.g., automatically) identify an issue with the policy and/or a need for more accurate or granular policy definitions, and may effect a roll forward of a subsequent change to the policy or cause a roll back of a policy change that might have triggered the MPCE 201 to run the certification/validation to begin with. As another example, the MPCE 201 may output one or more alarms to alert an administrator to the certification/validation failure to enable the administrator to make any network provision changes around a failed implementation. As yet another example, the MPCE 201 may perform trend analyses by tracking certification/validation results over time to determine whether issues tend to arise on certain days, during certain times, etc. As another example, the MPCE 201 may simply log the results as pass/fail, and take no further action. As a further example, the MPCE 201 may modify a behavior or function of one or more systems or devices in the core network 210 to effect a certain treatment to traffic associated with the subscriber of interest (e.g., to cap the speed of the traffic, to zero rate it, etc.).

As briefly described above, the engine can be universally implemented for use with any type of system in which there is policy-based differentiation of traffic. For instance, a shared or hybrid system may include an LTE network, a 5G network, a higher generation network, a Wi-Fi network, a Fixed Wireless network, and/or a wireline network that can all interwork and function as candidates for transport. In exemplary embodiments, a common policy charging/enforcement function and/or policy rulebase may be shared among the different networks, where procedures may be defined such that there is commonality in treatments and behaviors for traffic across the various networks. For example, the policy rulebase may include policy definitions that require some or all of the types of networks to zero rate a certain type of traffic for a particular user and/or rate limit (limit the data speed of) that certain type of traffic. Here, the engine may be capable of verifying whether there are uniform billing/treatments when the user transitions from using one network technology to another—e.g., when the subscriber switches from using Fixed Wireless to a mobile core (e.g., LTE, 5G, etc.), switches from the mobile core to Wi-Fi, switches from Wi-Fi to the wireline network, etc. For instance, the engine may be capable of validating that a common subscriber experience (for any of a number of characteristics in a policy rulebase) has been constructed, by validating that the mobile core properly zero rated that type of traffic and/or rate limited that type of traffic for the subscriber when the subscriber switched from using Fixed Wireless to using the mobile core, by validating that the Wi-Fi network properly zero rated that type of traffic and/or rate limited that type of traffic for the subscriber when the subscriber switched from using the mobile core to using the Wi-Fi network, by validating that the wireline network properly zero rated that type of traffic and/or rate limited that type of traffic for the subscriber when the subscriber switched from using the Wi-Fi network to using the wireline network, and so on. As another example, the policy rulebase may include one or more policies that require zero rating/rate limiting to be applied for all types of networks with the exception of a particular network—e.g., Fixed Wireless. In this example, the engine may validate that any transitions of the subscriber from using the particular network (e.g., Fixed Wireless) to using any other network result in zero rating/rate limiting by that other network, but that any transitions of the subscriber from using the other network(s) to using the particular network (e.g., Fixed Wireless) do not result in zero rating/rate limiting by that particular network.

It is to be understood and appreciated that the engine's capability to dynamically and automatically detect incremental changes to policy and trigger traffic generation for policy verification/certification, as described herein, provides an improvement over conventional techniques in that the engine can perform such functions for thousands (and perhaps millions) of incremental changes to policy relating to thousands (and perhaps millions) of subscribers of a network in a manner that would otherwise be impossible using existing manual-based checks.

It is also to be understood and appreciated that the quantity and arrangement of engines, devices, networks, functions, agents, and suites shown in FIG. 2A are provided as an example. In practice, there may be additional engines, devices, networks, functions, agents, and/or suites, fewer engines, devices, networks, functions, agents, and/or suites, different engines, devices, networks, functions, agents, and/or suites, or differently arranged engines, devices, networks, functions, agents, and/or suites than those shown in FIG. 2A. For example, the system 200 can include more or fewer engines, devices, networks, functions, agents, and/or suites, etc. In practice, therefore, there can be hundreds, thousands, millions, billions, etc. of such engines, devices, networks, functions, agents, and/or suites. In this way, example system 200 can coordinate, or operate in conjunction with, a set of engines, devices, networks, functions, agents, and/or suites and/or operate on data sets that cannot be managed manually or objectively by a human actor. Furthermore, two or more engines, devices, networks, functions, agents, or suites shown in FIG. 2A may be implemented within a single engine, device, network, function, agent, or suite, or a single engine, device, network, function, agent, or suite shown in FIG. 2A may be implemented as multiple engines, devices, networks, functions, agents, or suites. Additionally, or alternatively, a set of engines, devices, networks, functions, agents, or suites of the system 200 may perform one or more functions described as being performed by another set of engines, devices, networks, functions, agents, or suites of the system 200.

It is further to be understood and appreciated that, although FIG. 2A is described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2B:
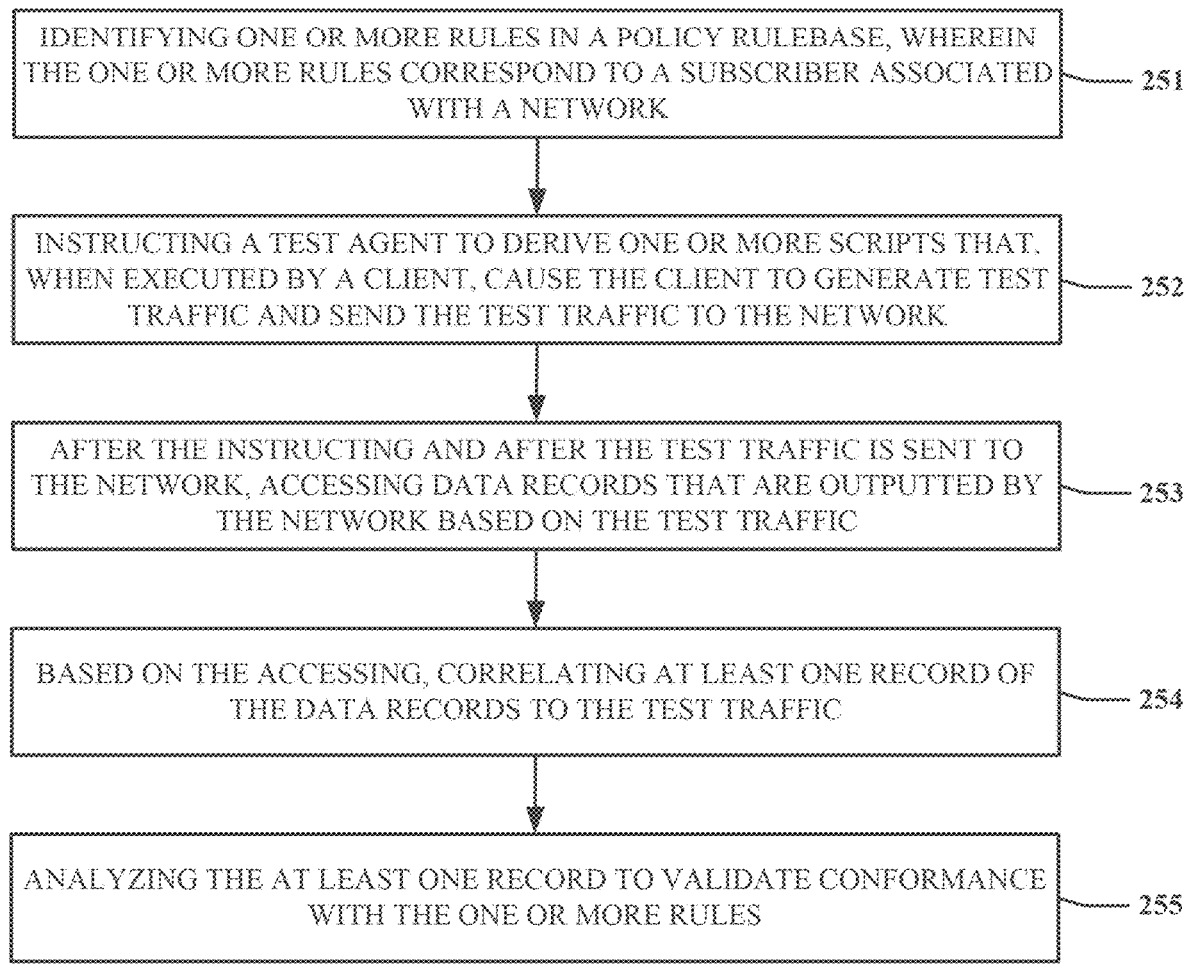
FIG. 2B depicts an illustrative embodiment of a method in accordance with various aspects described herein.

FIG. 2B depicts an illustrative embodiment of a method 250 in accordance with various aspects described herein. In some embodiments, one or more process blocks of FIG. 2B can be performed by a mobility policy certification engine, such as the MPCE 201.

At 251, the method can include identifying one or more rules in a policy rulebase, wherein the one or more rules correspond to a subscriber associated with a network. For example, the MPCE 201 can, similar to that described above with respect to the system 200 of FIG. 2A, perform one or more operations that include identifying one or more rules in a policy rulebase, wherein the one or more rules correspond to a subscriber associated with a network.

At 252, the method can include instructing a test agent to derive one or more scripts that, when executed by a client, cause the client to generate test traffic and send the test traffic to the network. For example, the MPCE 201 can, similar to that described above with respect to the system 200 of FIG. 2A, perform one or more operations that include instructing a test agent to derive one or more scripts that, when executed by a client, cause the client to generate test traffic and send the test traffic to the network.

At 253, the method can include, after the instructing and after the test traffic is sent to the network, accessing data records that are outputted by the network based on the test traffic. For example, the MPCE 201 can, similar to that described above with respect to the system 200 of FIG. 2A, perform one or more operations that include, after the instructing and after the test traffic is sent to the network, accessing data records that are outputted by the network based on the test traffic.

At 254, the method can include, based on the accessing, correlating at least one record of the data records to the test traffic. For example, the MPCE 201 can, similar to that described above with respect to the system 200 of FIG. 2A, perform one or more operations that include, based on the accessing, correlating at least one record of the data records to the test traffic.

At 255, the method can include analyzing the at least one record to validate conformance with the one or more rules. For example, the MPCE 201 can, similar to that described above with respect to the system 200 of FIG. 2A, perform one or more operations that include analyzing the at least one record to validate conformance with the one or more rules.

In some implementations of these embodiments, the one or more rules specify a particular billing scheme for traffic associated with the subscriber, a particular treatment for the traffic associated with the subscriber, or a combination thereof, wherein validating conformance comprises determining whether the particular billing scheme, the particular treatment, or the combination thereof are applied to the test traffic.

In some implementations of these embodiments, the policy rulebase includes rules for differentiated billing or service per subscriber, wherein attributes for the differentiated billing or service are based on upon data associated with one or more of Layer 3, Layer 4, Layer 5, Layer 6, and Layer 7 of an open systems interconnection (OSI) model.

In some implementations of these embodiments, the method includes detecting an incremental change to the policy rulebase, wherein the identifying is responsive to the detecting.

In some implementations of these embodiments, the identifying is performed via a policy-related function. In one or more of these implementations, the policy-related function comprises a policy and charging enforcement function (PCEF).

In some implementations of these embodiments, the test agent is equipped with one or more test generation suites for deriving the one or more scripts. In some implementations of these embodiments, the client comprises a client device or a simulated device. In some implementations of these embodiments, the data records comprise event data records (EDRs) and/or call detail records (CDRs).

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1, 2A, and 2B. For example, virtualized communications network 300 can facilitate, in whole or in part, dynamic policy certification/validation.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
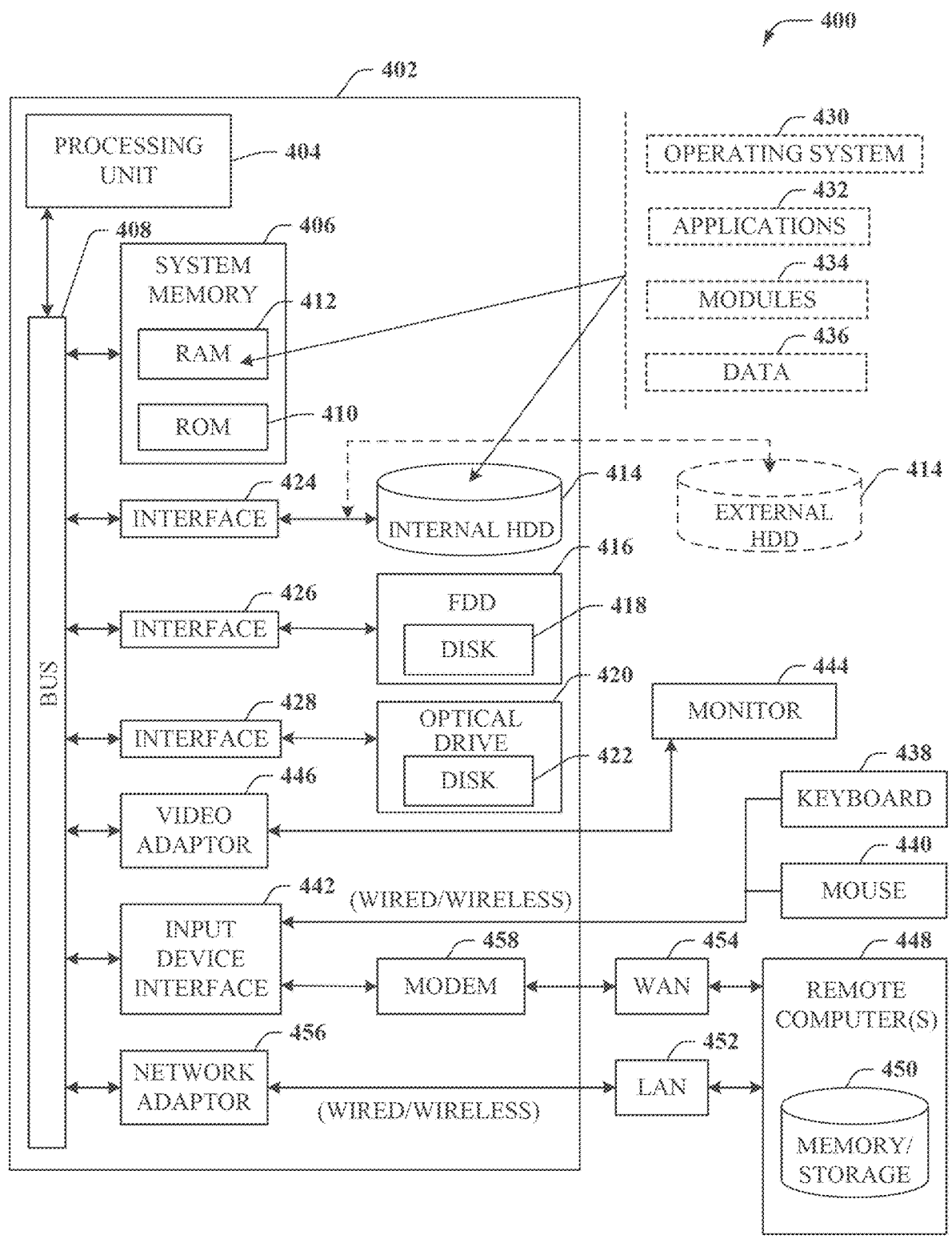
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, dynamic policy certification/validation.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
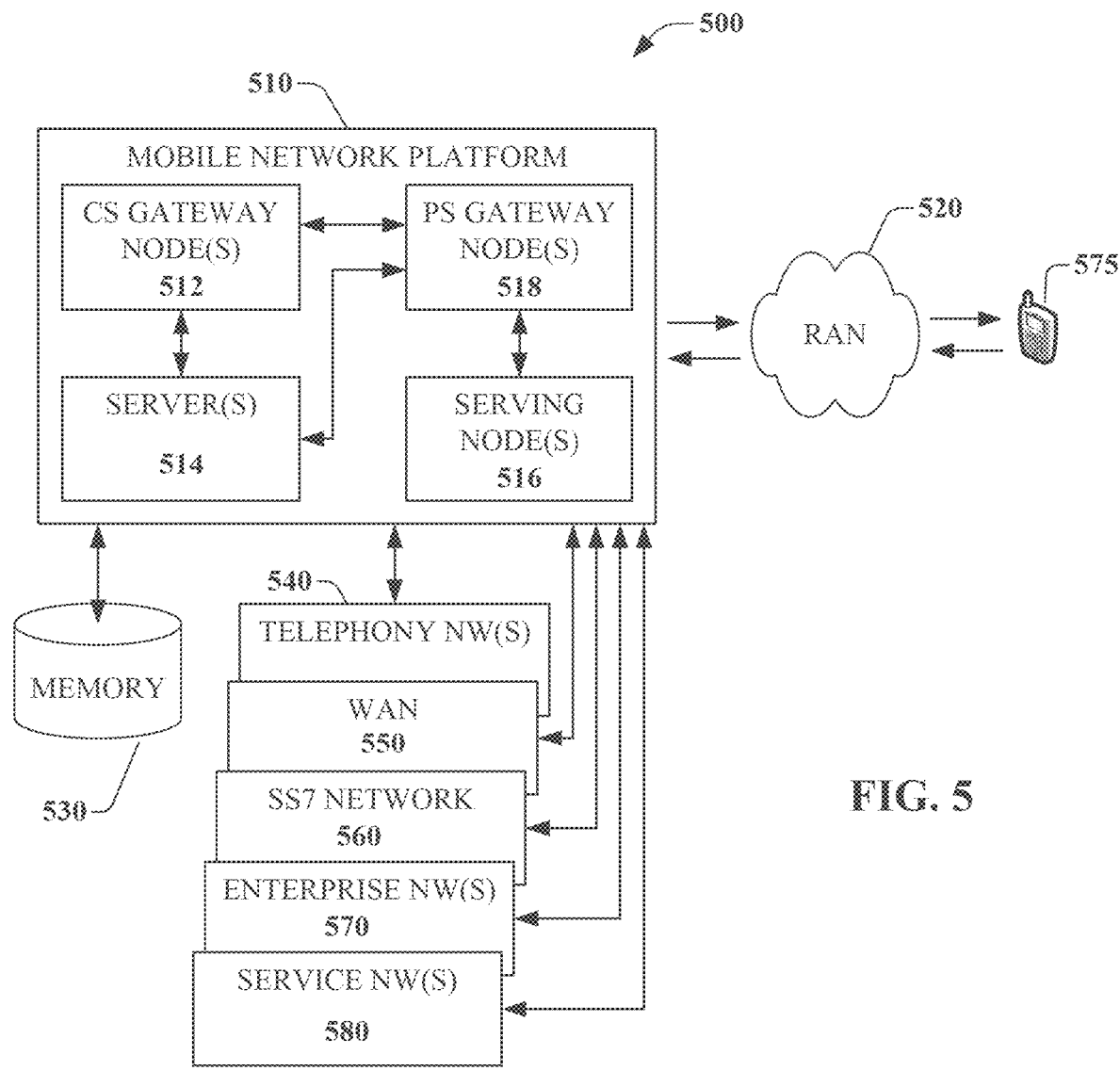
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, dynamic policy certification/validation. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
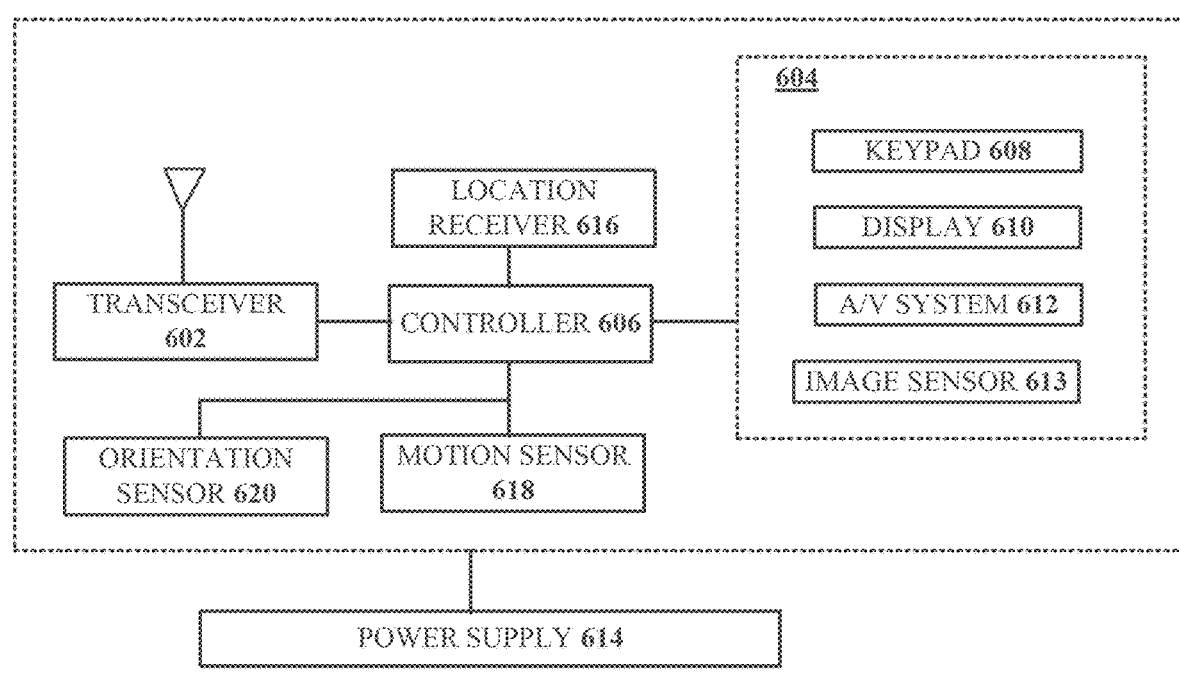
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, dynamic policy certification/validation.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgment requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying one or more rules in a policy rulebase, wherein the one or more rules correspond to a subscriber associated with a network;
instructing a test agent to derive one or more scripts that, when executed by a client, cause the client to generate test traffic and send the test traffic to the network;
after the instructing and after the test traffic is sent to the network, accessing data records that are outputted by the network based on the test traffic;
based on the accessing, correlating at least one record of the data records to the test traffic; and
analyzing the at least one record to validate conformance with the one or more rules.

2. The device of claim 1, wherein the one or more rules specify a particular billing scheme for traffic associated with the subscriber, a particular treatment for the traffic associated with the subscriber, or a combination thereof, and wherein validating conformance comprises determining whether the particular billing scheme, the particular treatment, or the combination thereof are applied to the test traffic.

3. The device of claim 1, wherein the policy rulebase includes rules for differentiated billing or service per subscriber, and wherein attributes for the differentiated billing or service are based on upon data associated with one or more of Layer 3, Layer 4, Layer 5, Layer 6, and Layer 7 of an open systems interconnection (OSI) model.

4. The device of claim 1, wherein the operations further comprise detecting an incremental change to the policy rulebase, and wherein the identifying is responsive to the detecting.

5. The device of claim 1, wherein the identifying is performed via a policy-related function.

6. The device of claim 5, wherein the policy-related function comprises a policy and charging enforcement function (PCEF).

7. The device of claim 1, wherein the test agent is equipped with one or more test generation suites for deriving the one or more scripts.

8. The device of claim 1, wherein the client comprises a client device or a simulated device.

9. The device of claim 1, wherein the data records comprise event data records (EDRs).

10. The device of claim 1, wherein the data records comprise call detail records (CDRs).

11. A non-transitory machine-readable medium, comprising executable instructions that, when executed by a processing system including a processor, facilitate performance of operations, the operations comprising:
receiving, from a policy certification engine, a command to generate test traffic, wherein the command is provided based on the policy certification engine identifying one or more rules in a policy rulebase that correspond to a subscriber associated with a core network;
deriving one or more scripts based on the receiving;
executing the one or more scripts to generate the test traffic; and
causing the test traffic to be transmitted over a mobility network to the core network, wherein the causing enables the policy certification engine to access data records that are outputted by the core network based upon traversal of the test traffic through the core network, correlate at least one record of the data records to the test traffic, and analyze the at least one record to validate conformance with the one or more rules.

12. The non-transitory machine-readable medium of claim 11, wherein the one or more rules specify a particular billing scheme for traffic associated with the subscriber, a particular treatment for the traffic associated with the subscriber, or a combination thereof, and wherein validating conformance comprises determining whether the particular billing scheme, the particular treatment, or the combination thereof are applied to the test traffic.

13. The non-transitory machine-readable medium of claim 11, wherein the policy rulebase includes rules for differentiated billing or service per subscriber, and wherein attributes for the differentiated billing or service are based on upon data associated with one or more of Layer 3, Layer 4, Layer 5, Layer 6, and Layer 7 of an open systems interconnection (OSI) model.

14. The non-transitory machine-readable medium of claim 11, wherein the receiving is based upon the policy certification engine detecting an incremental change to the policy rulebase.

15. The non-transitory machine-readable medium of claim 11, wherein the data records comprise event data records (EDRs), call detail records (CDRs), or a combination thereof.

16. A method, comprising:
detecting, by a processing system including a processor, an incremental change to a rule in a policy rulebase, wherein rule is associated with a user of a network, and wherein the incremental change specifies a particular treatment that the network is to apply to traffic relating to the user;
based on the detecting, causing, by the processing system, a test agent of a client device of the user to derive a test script that, when executed by the client device, outputs test traffic to the network;
responsive to the causing, obtaining, by the processing system, data records that are outputted by the network after the test traffic traverses at least a portion of the network;
based on the obtaining, correlating, by the processing system, at least one record of the data records to the test traffic; and
analyzing, by the processing system, the at least one record to verify that the particular treatment has been applied to the test traffic.

17. The method of claim 16, wherein the network comprises a Long Term Evolution (LTE) network, a 5G network, a higher generation network, a Fixed Wireless network, Wi-Fi network, or a combination thereof.

18. The method of claim 16, wherein the particular treatment comprises zero rating the traffic, rate limiting the traffic, or a combination thereof.

19. The method of claim 16, further comprising, based on identifying that the particular treatment has not been applied to the test traffic, performing, by the processing system, one or more actions that include:
outputting an alarm to a network administrator regarding failure of the incremental change;
causing a rolling back of the incremental change;
causing a rolling forward of a different change to the rule; or
a combination thereof.

20. The method of claim 16, wherein the policy rulebase includes rules for differentiated billing or service per user, and wherein attributes for the differentiated billing or service are based on upon data associated with one or more of Layer 3, Layer 4, Layer 5, Layer 6, and Layer 7 of an open systems interconnection (OSI) model.

* * * * *